United States Patent [19]

Auberon et al.

[11] Patent Number: 5,288,109
[45] Date of Patent: Feb. 22, 1994

[54] METHOD FOR MECHANICAL JOINING A TUBE OF COMPOSITE MATERIAL AND A METALLIC FITTING AND STRUCTURE THUS OBTAINED

[75] Inventors: Marcel Auberon, le Haillan; Jean-Jacques Thouraud, Martignas; Charles Sparks, le Vesinet; Pierre Odru, Fontenay Sous Bois, all of France

[73] Assignees: Societe Nationale Industrielle et Aerospatiale, Paris; Institue Francois du Petrole, Rueil-Malmaison, both of France

[21] Appl. No.: 871,327

[22] Filed: Apr. 21, 1992

[30] Foreign Application Priority Data

Apr. 22, 1991 [FR] France ............................ 91 05340

[51] Int. Cl.⁵ .................... F16L 39/00; F16L 47/06; B23P 11/00
[52] U.S. Cl. .................... 285/149; 285/242; 156/169; 242/7.02; 242/7.22; 138/109; 29/432; 29/525.1; 403/408.1
[58] Field of Search ............. 29/432, 525.1; 156/169, 156/172, 173, 252, 253; 242/7.02, 7.21, 7.22; 464/181-183; 403/224, 378, 408.1; 285/242, 149; 138/109

[56] References Cited

U.S. PATENT DOCUMENTS

| 4,185,472 | 1/1980  | Yates et al. ............... 464/181     |
| 4,362,521 | 12/1982 | Pock ....................... 464/181     |
| 4,605,385 | 8/1986  | Pock ....................... 464/181     |
| 4,649,960 | 3/1987  | Policelli .................. 464/182 X   |
| 4,713,040 | 12/1987 | Beigang et al. ............. 464/181 X   |
| 4,755,406 | 7/1988  | Fuchs ...................... 156/173 X   |
| 5,062,914 | 11/1991 | Fuchs et al. ............... 156/173 X   |

FOREIGN PATENT DOCUMENTS

| 0019585 | 11/1980 | European Pat. Off. . |
| 0093012 | 11/1983 | European Pat. Off. . |
| 0239338 | 9/1987  | European Pat. Off. . |
| 0385839 | 9/1990  | European Pat. Off. . |
| 2509011 | 1/1983  | France . |

Primary Examiner—Mark Rosenbaum
Assistant Examiner—S. Thomas Hughes
Attorney, Agent, or Firm—Roylance, Abrams, Berdo & Goodman

[57] ABSTRACT

A method of joining a tube of composite material and a tubular metal fitting includes, winding filaments of pre-impregnated fibers to produce a tube with a longitudinal axis. The fibers that provide tensile strength for the tube are at a tensile fiber angle relative to the longitudinal axis. A tubular metal fitting is introduced at least partially into an end of a tube section, with inner and outer parts of the fitting being located inside and outside of the tube section. The inner and outer parts are secured by inserting penetrating elements extending radially through the tube section and the parts of the fitting. The penetrating elements are arranged in uniform circumferential alignments which are equally spaced from each other along the longitudinal axis. Each circumferential alignment defines an alignment plane perpendicular to the longitudinal axis and spaced by a distance which is a function of an integer, the number of circumferential alignments, the interval between two consecutive penetrating elements in the same circumferential alignment and the tensile fiber angle.

14 Claims, 4 Drawing Sheets

METHOD FOR MECHANICAL JOINING A TUBE OF COMPOSITE MATERIAL AND A METALLIC FITTING AND STRUCTURE THUS OBTAINED

FIELD OF THE INVENTION

The present invention relates to a method for mechanical joining a metallic fitting, in particular an end coupling member, onto a tube of a composite material, especially for use in offshore oil exploration.

BACKGROUND OF THE INVENTION

In the offshore oil exploration field, the tubes and their end coupling members must resist tensile loads capable of reaching, in normal conditions of use, about a million Newtons.

The metallic tubes with metallic end coupling members used in oil exploration resist such loads.

Various industrial methods have been developed to produce composite tubes fitted with metallic end coupling members and capable of withstanding the significant tensile loads. The composite tubes have substantial advantages over metallic tubes because of their fatigue strength, corrosion resistance and lower weight.

According to a method described in French patent FR-A-2,509,011 by the applicants, a conical metallic insert is placed at the end of a composite tube. Between the outer surface of this end and the inner wall of the tube, an elastomeric layer is applied and adhesively bonded onto this outer surface, so that the loads are transmitted through the elastomeric layer. After a first polymerization of the tube, a second metallic member in the shape of a shell is applied on the polymerized composite, and is then hooped by a circumferential winding, for example of glass fibers. The metal/composite bond can also be provided through another elastomeric layer by a second curing to provide the polymerization of the outer hooping and the adhesive films.

A further method, described in EP-A-0,093,012, enables the joining of a tube made up of filament windings and of another body. Tubular and hollow metallic envelopes are interposed between fiber layers made up of filament windings, spaced in the radial direction, this being done at the ends. The connection is provided by securing devices which pass through the composite and the metallic envelopes. In this case, the tensile load applied to the metallic end coupling member is transmitted to the composite structure by a "hammering" effect.

According to yet another method described in French Patent FR-A-2,641,841 by the applicants, essentially longitudinal fibers are would continuously around a cylindrical mandrel in order to constitute the running part of the composite tube and, at the same time, around a metallic bi-conical shaped end coupling member. These longitudinal fibers are next bound to the metallic end coupling member by circumferential fibers before providing a final polymerization of the tube. Supplementary means are provided to enhance the integration of the end coupling member in the tube, and thus, limit the tube elongation.

These methods provide tubes which can be described as "rigid" by contrast with the "flexible" or "supple" metallic tubes, and which can withstand the tensile loads of the exploitation conditions of oil exploration at sea, while offering a minimal elongation under the internal pressure. However, such tubes all have the drawback that the length of the finished tube must be known before proceeding to the fabrication of the running part of the tube, that is to say the arrangement of filament windings.

In fact, in the three techniques referred to above, the winding of the filament layers constituting the tube is carried out on a mandrel bearing the connecting fittings, or end coupling members, of the tubes. These fittings are then wrapped by the fibers, and thus, "fixed" to the composite material.

Thus, it is not possible to produce and stock composite tubes until such time as the required length of the tube, equipped with connecting and coupling members, is known.

SUMMARY OF THE INVENTION

An object of the present invention is to provide a system for joining a metallic end coupling member, or, more generally a metallic fitting, to a composite tube previously wound and polymerized or hardened.

Another object of the present invention involves connecting a metallic fitting to a preformed composite tube by penetrating elements embedded into the two elements to be assembled so as to obtain a joining having a maximal tensile strength compared with the strength of the running part of the tube.

The present invention relates to a method for mechanical joining a tube made up of a composite material and a tubular metal fitting. In a first step, a tube of constant section is provided by winding filaments of pre-impregnated fibers which can be subjected subsequently to polymerization. The tube thus obtained can be cut into sections at right angles to its axis, to the desired length. Then, a tubular metal fitting is introduced at least partially into each end of the tube. The end of the tube and the penetrating part of the metal insert are secured by penetrating elements arranged according to at least uniform circumferential alignments, which are identical and identically spaced from one another. Each circumferential alignment defines a plane perpendicular to the axis of the tube and conforms to the following law of distribution:

$$D = \frac{(n-1)i}{K \tan \alpha} \quad \text{in which}$$

$D$ = the distance between two successive planes of circumferential alignments of penetrating elements,
$K$ = an integer equal to 1 or 2,
$n$ = the number of alignments,
$i$ = the interval between two consecutive penetrating elements of the same alignment, and
$\alpha$ = the angle, with respect to the axis of the tube, of the layer of fibers providing the tensile strength.

Such method balances the resistance to "hammering" load of the composite material opposite the penetrating elements and the tensile strength of the remaining section of composite material on the first circumferential alignment of penetrating elements, which integrally withstands the whole tensile load. The following alignments (towards the end of the tube) withstand a progressively lower tensile load according to their rank.

Once this prior choice has been made, having regard to the distribution requirements set out above, the penetrating elements are distributed along helical lines, and more precisely, according to both right-hand pitch helical alignments and left-hand pitch helical alignments. All helical alignments are at the same angle equal to the positive or negative winding angle, corresponding to the backwards and forwards winding directions, respectively, of the fibers.

The above penetrating elements will be aligned according to generatrices of the tube or in staggered rows, according to whether the value adopted for the coefficient K is 1 or 2. One or other of these values is selected at will and takes into account the value of the winding angle. The effects of the two distribution modes are similar.

Each helical alignment of penetrating elements will affect the same bundle or bundles of fibers. Thus, the number of fibers sectioned for the implantation of the penetrating elements will be reduced.

The number of penetrating elements per circumferential alignment is determined, as indicated above, in order to obtain the balance between resistance to "hammering" load and tensile strength of the composite material on the first alignment. The total number of penetrating elements for each end of the tube is determined to obtain the desired resistance to "hammering" load. The elements are distributed according to an appropriate number n of adjacent circumferential alignments.

Calculations and tests have shown that three was an optimal value for the number n.

According to an embodiment of the method of the present invention, the metal fitting comprises an inner tubular part introduced into the tube, and an outer tubular element coaxial and integral with the inner part to sandwich the end of the tube. The penetrating elements can be pins extending through bores formed radially in the two metallic elements and the end of the tube.

Advantageously, the bores formed in the inner tubular metallic part are blind and do not open on the inner wall or surface of the metal fitting.

The method of the present invention does not necessitate any machining, either of the outside or of the inside, of the composite tube. This guarantees the integrity of the resistance of the tube. Machining includes all grinding of the diameter, internal or external, likely to cut into the fibers, and thus, diminish the resistance.

On the other hand, it may be necessary to perform a prior "bleaching" of the end of the tube, internal as well as external. The "bleaching" eliminates surface defects due to "rejects" of resin. Such "bleaching" is not likely to reach the fibers, that is to reduce the intrinsic resistance of the tube.

The method of the present invention can be applied to a tube having fibers wound along a constant angle.

It can apply also to a tube having two types of fibers wound along different angles.

In this case, the penetrating elements are distributed in conformity with the above law of distribution, taking into account only the winding angle of the fibers which are the most loaded in tension, that is, the fibers having the lowest winding angle with respect to the axis of the tube, without taking into account the fibers wound along the other winding angle. These latter fibers will be taken into account, to a certain extent, in distributing the penetrating elements in a particular manner.

This particular manner involves distributing the penetrating elements according, on the one hand, to two circumferential alignments complying with the law of distribution set out above and in which the angle $\beta$ is the winding angle of the fibers which are the most loaded in tension and, on the other hand, to a third alignment interposed between the first two and delimited by the intersections between one or other of the helical alignments, with a left-hand or right-hand pitch.

The penetrating elements of the above-mentioned two alignments and one or other of the helices, with a left-hand or right-hand pitch, are equal in angle to the winding angle of the second type of fibers and cross the penetrating elements of the first alignment.

Preferably, the following supplementary condition will be assigned to the distance D between two consecutive circumferential alignments:

$D \geq K'd$ in which $K'$ = an integer or a mixed number ranging from 3 to 4, $d$ = the diameter of a penetrating element.

This supplementary requirement can equally be imposed in a general manner to any distribution of the penetrating elements according to the present invention.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
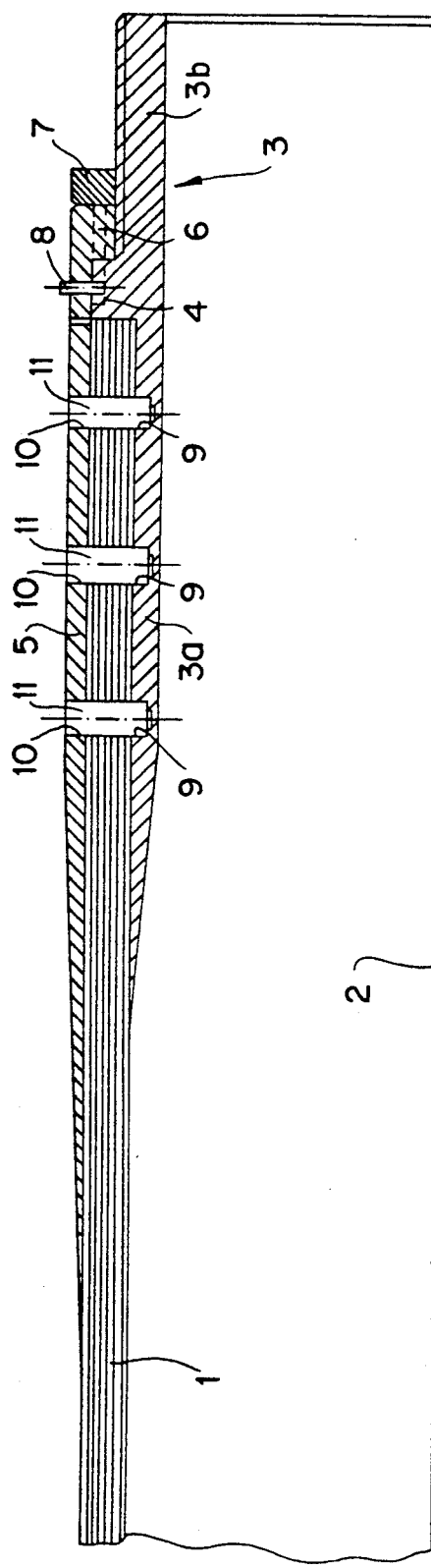
FIG. 1 is a partial side elevational view in section of the end of a composite tube joined to a metal end coupling member in accordance with a first embodiment of the present invention.

FIG. 1 illustrates a tube 1 made up of composite material of constant thickness and formed by winding fibers, for example, carbon fibers. The fibers are wound along the same winding angle, marked $\alpha$ in absolute value, relative to the axis 2 of the tube. An equal proportion of fibers is wound in a $+\alpha$ direction, for example, winding to the left or in the forward direction, and in a $-\alpha$ direction, winding to the right or in the backward direction.

It will be assumed, at first, that the tube 1 comprises only the wound carbon fibers. The thickness of the tube is for example, about 20 mm.

The tube 1 is formed in a known manner, by winding pre-impregnated fibers on a mandrel, followed by a polymerization. After that, the tube is withdrawn from the mandrel and cut into sections to the desired length.

In the embodiment shown in FIG. 1, the end of the tube receives a metallic tubular fitting. The metal fitting has an end coupling member 3 comprising a part 3a in the form of a wedge, or inner insert, intended to be inserted inside the tube 1. The tube end abuts against a shoulder 4 of the end coupling member 3 and a separate metallic outer tubular part or insert 5, coaxial with the end coupling member. Outer tubular part 5 is added and secured on the outside of the end coupling member to grip the end of the tube in a sandwich manner with the inner part 3a. The outer part 5 comprises an inner peripheral heel 6 locked between the shoulder 4 and a nut 7 screwed onto a thread on the outer part 3b of the end coupling member.

A pin 8 extends radially through the outer insert 5 and penetrates partially into the shoulder 4. This allows a radial indexing of the tube 1.

The areas of insertion of the penetrating elements in the inner part 3a and outer part 5 have constant thicknesses. Beyond the insertion areas, that is, towards the central part of the tube, the thicknesses of parts 3a and 5 are reduced uniformly according to a slope intended to minimize the local bending of the composite material in the transition area between the running part of the tube and the metallic end coupling member.

The inner part 3a and the outer part 5 are provided with radial bores 9 and 10, respectively. The radial bores receive pins 11 extending radially through the wall of the tube 1. The pin ends are seated in opposing radial bores 9 and 10.

Figure 2:
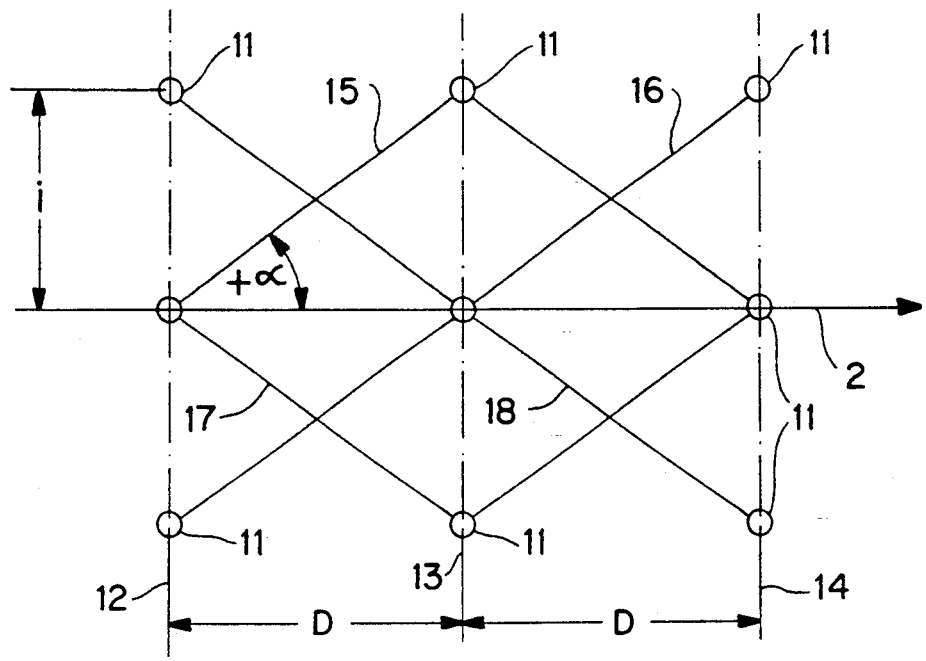
FIG. 2 is a diagram of the distribution pattern according to generatrices of the tube of the pins of the device of FIG. 1.

FIG. 2 illustrates the distribution pattern of the pins 11 all around the tube 1 and its end coupling member 3.

The pins 11 are distributed in three circumferential alignments 12, 13 and 14 (FIG. 2). Each circumferential alignment comprises the same fixed number of pins regularly distributed along an angle, the interval between two pins being i. Each alignment defines a plane perpendicular to the axis 2 of the tube. The distance D between two consecutive planes or alignments 12, 13, 14 is identical.

The pins 11 are, according to the present invention, distributed according to the law:

$$D = \frac{(n-1)i}{K \tan \alpha} \quad \text{in which}$$

D = the distance between two successive planes of circumferential alignments (12, 13, 14),
K = is equal to 1, which corresponds to a distribution of the pins 11 according to generatrices of the tube 1,
n = the number of alignments, and is equal to 3,
i = the interval between two consecutive pins of the same circumferential alignment (12, 13, 14),
$\alpha$ = the winding angle, with respect to the axis 2 of the tube 1, of the fibers of the tube.

Figure 3:
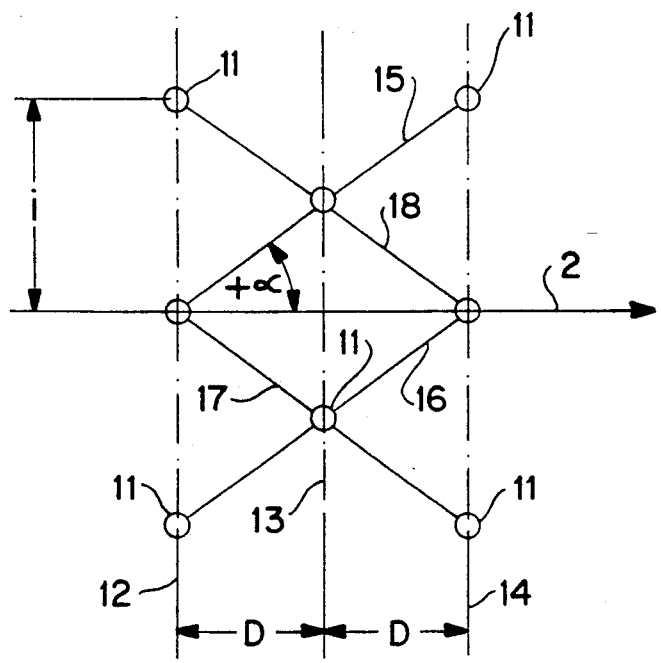
FIG. 3 is a diagram of a distribution pattern of the pins, according to a second embodiment of the present invention, in staggered rows, for the same winding angle as that of FIG. 2.

FIG. 3 illustrates a distribution pattern of the same total number of pins 11, also in three circumferential alignments 12, 13, 14, as the pattern illustrated in FIG. 2, and complies with the same law of distribution. However, the coefficient K has a value equal to 2, corresponding to a staggered row distribution of the pins 11.

The effects of the two patterns of distribution in FIGS. 2 and 3 are equivalent, as will be explained by reference to FIG. 4.

The spatial distribution of the pins 11, whether according to the pattern in FIG. 2 or according to the pattern in FIG. 3, is such that the pins 11 are in helical alignments 15 and 16 with a left-hand pitch of angle $+\alpha$, (FIGS. 2 to 4), and in helical alignments 17 and 18 with a right-hand pitch of angle $-\alpha$.

These helical alignments correspond to bundles of fibers in forward and backward directions. The same forward bundle, for example N (FIG. 4), will be crossed through from place to place by all the pins 11 of the alignment 16. The same backward bundle, for example N', will be crossed through from place to place by all the pins 11 of the alignment 18.

By bundle, the set of fibers superimposed over the entire thickness of the tube is contemplated.

In that way, a minimal number of fibers of the winding will be cut by the bores provided for the pins 11.

Figure 4:
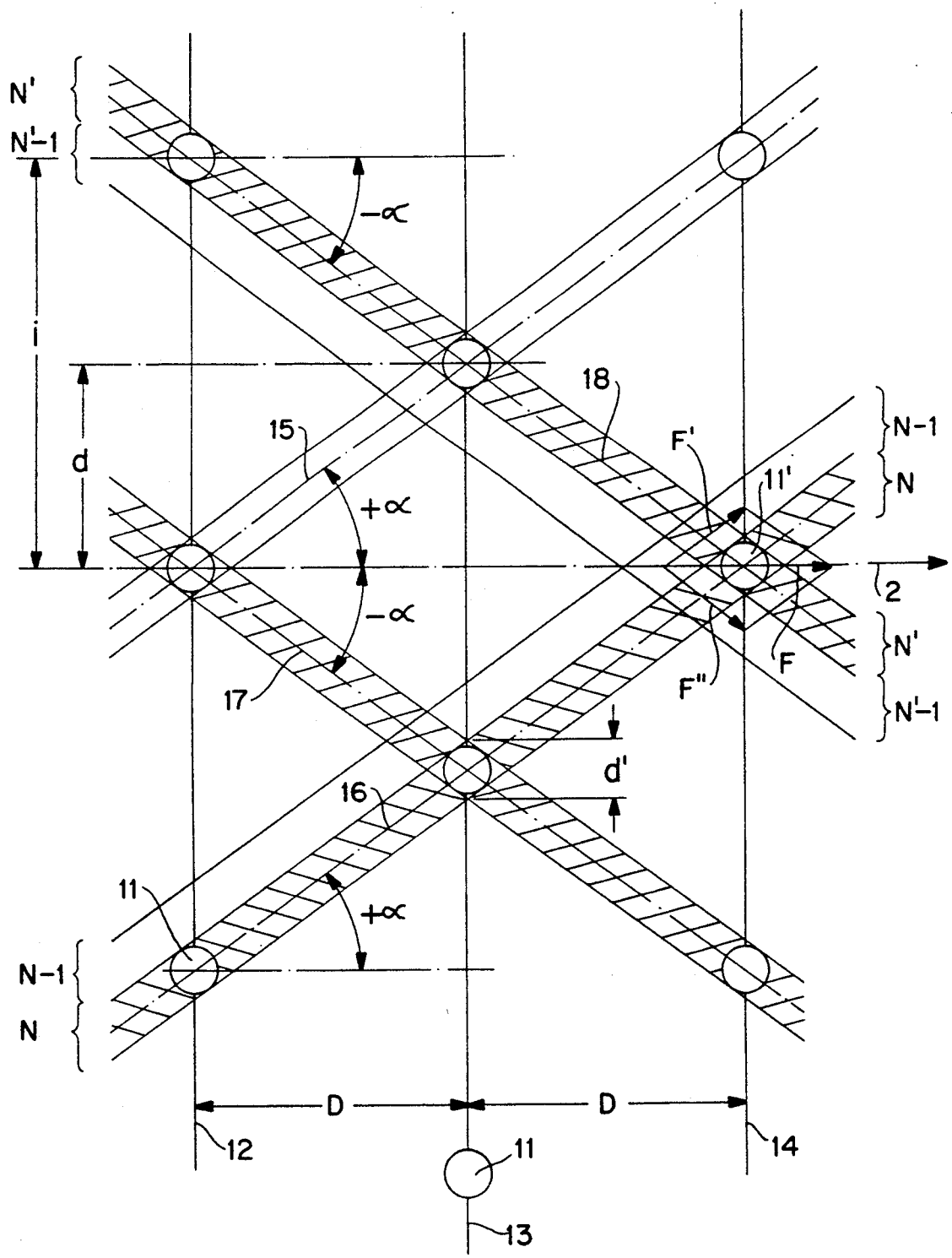
FIG. 4 is an enlarged and more detailed view of FIG. 3.

Thus, for example, the conjunction of the bundles of fibers N-1 and N'-1, which precede the bundles N and N' when viewing the winding from the left towards the right in FIG. 4, will take up the longitudinal loads F applied to the pin 11'. The bundle N-1 will withstand the load F'. The bundle N'-1 will withstand the load F''. The resultant of F' and F'' is equivalent to F in absolute value.

The delimitation of the bundles of fibers N,N',N-1,N'-1 is purely artificial and intended simply to facilitate the understanding of the effects of the particular implantation of the pins 11. The fibers are aligned and distributed in a homogeneous way through the entire thickness of the tube 1.

After calculations and tests, it was found that three was an optimal number of circumferential alignments.

Each circumferential alignment 12, 13 or 14 comprises the same number of pins 11. This number is preferably determined to obtain a balance between the resistance to "hammering" load of the composite material bearing on all the pins of the assembly and the tensile strength of the remaining section of composite material on the circumferential alignment in question.

The calculations are performed considering the resistance of the composite material. The composite material resistance is less than that of the material, for example, stainless steel, of the end coupling member (3,5).

Balancing between resistance to "hammering" load and tensile strength satisfies the following equation:

$$Rm \cdot d \cdot N \cdot n = Rt \, (\pi D - d \, N)$$

in which:
$Rm$ = the resistance to "hammering" load of the composite material,
$d$ = the diameter of the pins,
$N$ = the number of pins per circumferential alignment,
$n$ = the number of circumferential alignments,
$Rt$ = the tensile strength of the composite material,
$D$ = the average diameter of the composite tube, and $$d' = \frac{d}{\cos \alpha} = \text{decreasing of the resistant section due to the presence of a bore formed in the fibers.}$$

Comparing FIGS. 2 and 3, in the distribution of the pins 11 according to generatrices (FIG. 2), the distance D between two consecutive circumferential alignments (12,13,14) is twice that of the distribution in taggered rows (FIG. 3). Thus, the choice of the value 1 or 2 for coefficient K may depend on the configuration of the metallic end coupling member 3 and on the value of the angle α. For the same number of circumferential alignments, a greater concentration of pins could be selected (FIG. 3), covering a shorter length on an end coupling member.

Figure 5:
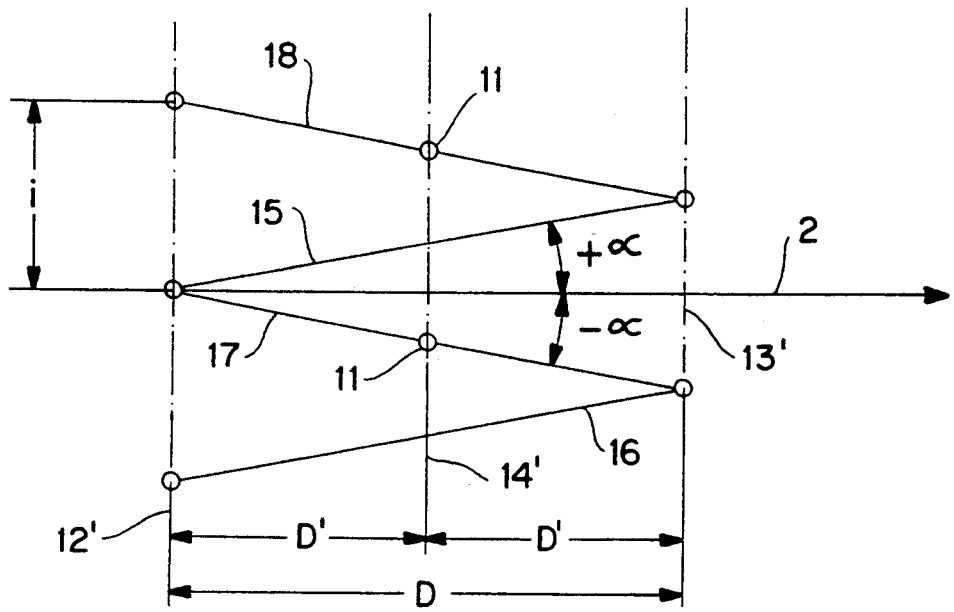
FIG. 5 is a diagram illustrating a distribution pattern of the method of the present invention, according to a third embodiment of the present invention, for a low winding angle of the fibers.

The case can occur, nevertheless, of a tube with a small winding angle α, as illustrated by FIG. 5. With such an angle, a more dense distribution in staggered rows of the pins on three circumferential alignments extends over a too wide surface of the end coupling member. Then, according to an alternative embodiment of the present invention, two circumferential alignments 12' and 13' will be defined, corresponding to the law of distribution according to the present invention, with K=2. Between the two alignments 12' and 13', preferably at mid-distance, a third alignment 14' is added, identical to the two others and constituted by pins 11 placed on the right-hand pitch helical alignments 17,18 as illustrated in FIG. 5, or on the left-hand pitch helical alignments 15,16. This distribution is a compromise, since the pins 11 of the alignment 14' will necessarily affect the forward (or backward) winding of the fibers.

Moreover, the distance D' between two consecutive circumferential alignments (12',13',14') can be set at a minimal value by constraining the implantation of pins by respecting, moreover, the following condition:

$$D' \geq K'd$$

in which
K' = an integer or a mixed number ranging from 3 to 4, and
d = the diameter of a pin.

In the case of FIG. 5, for the available or desirable length for the implantation of pins on the metal end coupling member in three circumferential alignments, due to the value of the angle α, the distance D' may not fulfil the second condition set out above. In such case, two alignments 12' and 13' would be used or adopted. This second condition may clearly be applied to the distance D of the distribution patterns of FIGS. 2 to 4.

If the tube comprises two types of fibers, for example, carbon fibers intended to carry the longitudinal loads and glass fibers intended to carry the circumferential loads, the winding angle α of the carbon fibers will be taken into account for the distribution of the pins. The higher or lower number of glass fibers cut for the insertion of the pins will not fundamentally affect the behavior of the end coupling member with respect to the longitudinal loads.

The mounting of the inner part 3a and outer part 5, as well as the drilling of the bores 9 and 10, does not necessitate any machining of the end of the tube 1, either inside or outside. The generatrices of the tube remain rectilinear. Only a light non-destructive "bleaching" of the fibers may be necessary to remove resin thrown outs and enable the mounting, especially of the inner part 3a.

Moreover, the increases in external diameter and the decreases in internal diameter at the level of the parts 5 and 3a are minimized as much as possible with respect to the running part of the composite tube.

Figure 6:
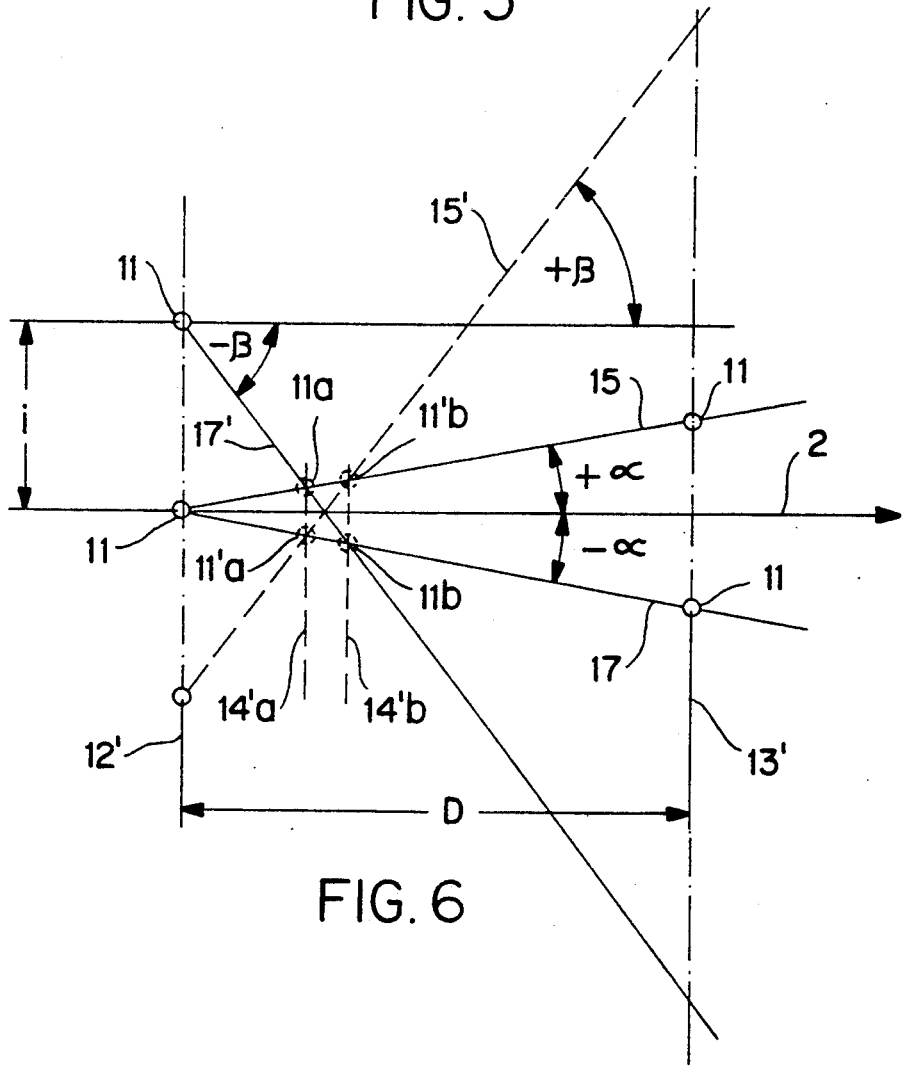
FIG. 6 is a diagram illustrating a distribution pattern of pins according to a fourth embodiment of the present invention which takes into account a second type of fibers having a winding angle different from that of the first type of fibers.

However, it can be advantageous to account for the second type of fiber and to find a compromise enabling, not only a limitation of the cutting of the fibers having the highest coefficient of tensile strength, under the same conditions as set out above, but also, to a certain extent, the best use of the fibers of the other type which also participate, although to a lower degree, in the strength of the tube with respect to the longitudinal loads. FIG. 6 illustrates a distribution of the pins in such case, according to another embodiment of the method of the present invention.

As in FIG. 5, two circumferential alignments 12',13' of pins 11 are defined. The alignments correspond to the law of distribution of the present invention, with the angle α of the first type of fibers and with K=2.

A third circumferential alignment (14'a or 14'b) is defined, interposed between the two others and constituted by pins implanted at the intersection of the right-hand pitch helix 17' passing through the pins 11 of the first alignment 12' and of angle β. Angle β is equal to the winding angle of the second type of fibers (or even of the left-hand pitch helix of the same angle) with one or other of the helical alignments, with a left-hand pitch 15 or a right hand pitch 17, of the pins 11. At one of the two intersections, a pin 11a or 11b will be implanted.

Whichever of the two pins 11a,11b satisfies, the supplementary condition set out above regarding the minimal distance between the third alignment 14'a or 14'b and one or other of the alignments 12' and 13' will possibly be chosen. In that way, the pins (11a or 11b) of the third alignment will be on bundles of fibers, of the first and of the second type, already cut by the pins 11 and the first two alignments 12' and 13'. However, the pins 11a or 11b will affect the backward (or forward) winding of the fibers of the second type.

In the case where the supplementary condition is not satisfied for either of the alignments 14'a, 14'b, for example where the angles α and β are close together, distribution will be according to FIG. 5.

If the left-hand pitch helices of angles +β 15' are chosen, the pins will be implanted as illustrated at 11'a and 11'b in FIG. 6, symmetrically with the pins 11a, 11b with respect to the axis 2 of the tube 1.

Figure 7:
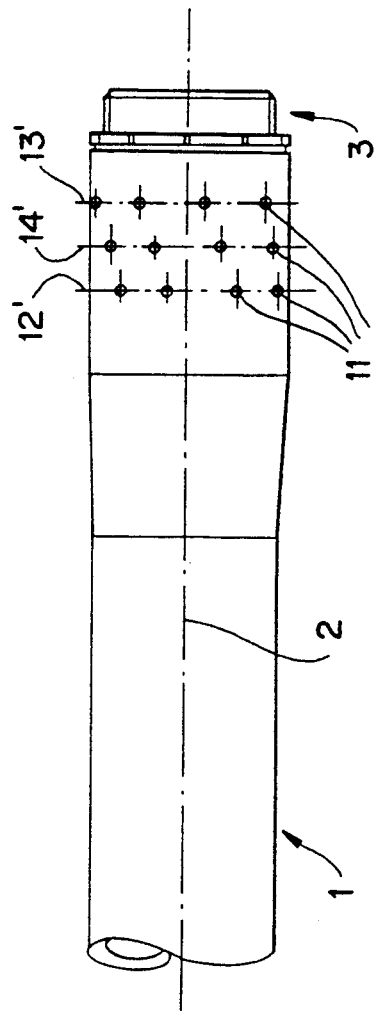
FIG. 7 is a side elevational view of the end of a composite tube having two types of fibers with different winding angles, equipped with a metal end coupling member whose pins are distributed according to the diagram of FIG. 6.

FIG. 7 represents a metal end coupling member 3 fixed to the end of a composite tube 1. An implantation of the pins 11 is according to the pattern of FIG. 6 (pins 11 and 11a or 11'b)

Figure 8:
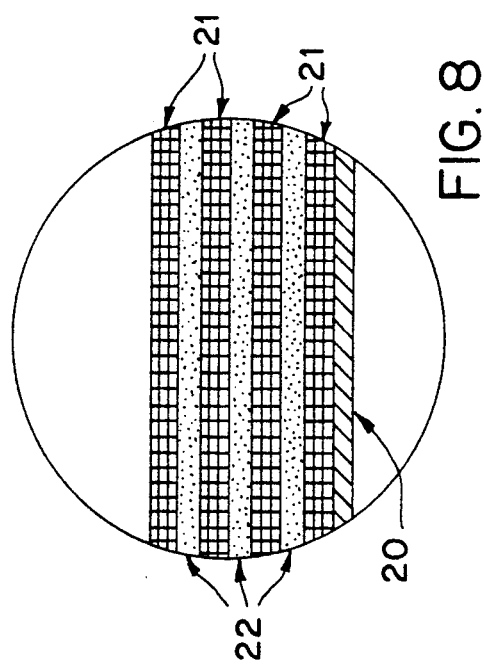
FIG. 8 is a cross-sectional view of the tube of FIG. 7, illustrating a distribution pattern for layers of the two type of fibers.

FIG. 8 shows an illustrative embodiment of the tube 1 with two types of windings. A winding mandrel 20 supports strata of glass fibers 21, each constituted by a certain number of layers of fibers, and three strata of carbon fibers 22, each also constituted by a certain number of layers of fibers. The winding angle of the glass fibers is, for example, on the order of 60°. The winding angle of the carbon fibers is on the order of 20°.

The two alignments 12' and 13' of pins 11 of FIG. 7 are determined by the law of distribution according to the present invention with α=20° and K=2. The intermediate alignment 14' is determined in accordance with the distribution pattern illustrated by FIG. 6, with helices 15' of angle +β=60°.

The method of the present invention applies in general manner to all joining of a composite tube stressed in tension, compression, inner pressure, and torsion, with a tubular metal fitting added to the ends, and particularly, but not exclusively, with end coupling members.

While various embodiments have been chosen to illustrate the invention, it will be understood by those skilled in the art that various changes and modifications can be made therein without departing from the scope of the invention as defined in the appended claims.

We claim:

1. A method of joining a tube of composite material and a tubular metal fitting, comprising the steps of:

winding filaments of pre-impregnated fibers to produce a tube of composite with a longitudinal axis, the fibers providing tensile strength for the tube being at a tensile fiber angle relative to the longitudinal axis;

introducing a tubular metal fitting at least partially into an end of a tube section of said composite material tube with inner and outer parts of the fitting being located inside and outside of the tube section, respectively; and securing the inner and outer parts to the tube section by inserting penetrating elements extending radially through the tube section and the parts of the fitting, the penetrating elements being arranged in uniform circumferential alignments which are equally spaced from each other along the longitudinal axis, each of the circumferential alignments defining an alignment plane perpendicular to the longitudinal axis and conforming to $$D = \frac{(n-1)i}{K \tan \alpha}$$

where $D$ = distance between two adjacent alignment planes of the circumferential alignments, $K$ = an integer equal to 1 or 2, $n$ = number of circumferential alignments of penetrating elements, $i$ = an interval between two consecutive penetrating elements in the same circumferential alignment, and $\alpha$ = the tensile fiber angle.

2. A method according to claim 1 wherein the same number of penetrating elements are inserted in each of the circumferential alignments to obtain a balance of resistance to hammering load of the tube composite material bearing on all of the penetrating elements and a tensile strength of a remainder of the composite material of a respective circumferential alignment, the balance satisfying $$Rm \cdot d \cdot N \cdot n = Rt \, (\pi D - d'N) \text{ where}$$

$Rm$ = resistance to hammering load of the composite material, $d$ = diameter of penetrating elements, $N$ = number of penetrating elements per circumferential alignment, $n$ = number of circumferential alignments of penetrating elements $Rt$ = tensile strength of the composite material, $D$ = average diameter of the tube, and $d' = \dfrac{d}{\cos \alpha}$ = decreasing of resistant section due to presence of bores formed in the fibers.

3. A method according to claim 2 wherein $K = 2$; and first, second and third circumferential alignments are formed with the third circumferential alignment interposed between, parallel to, and equally spaced from the first and second circumferential alignments, the penetrating elements of the third circumferential alignment being on one of a left-hand pitch helical alignment and a right-hand pitch helical alignment defined by the penetrating elements of the first and second circumferential alignments.

4. A method according to claim 2 wherein n is 3.

5. A method according to claim 1 wherein $K = 2$; and first, second and third circumferential alignments are formed with the third circumferential alignment interposed between, parallel to, and equally spaced from the first and second circumferential alignments, the penetrating elements of the third circumferential alignment being on one of a left-hand pitch helical alignment and a right-hand pitch helical alignment defined by the penetrating elements of the first and second circumferential alignments.

6. A method according to claim 1 wherein the tube is formed by winding first and second types of fibers at two different angles, the angle $\alpha$ selected for orienting the penetrating elements being the angle of the first type of fibers which has the higher tensile strength.

7. A method according to claim 6 wherein $K = 2$; and first, second and third circumferential alignments are formed with the third circumferential alignment interposed between and parallel to the first and second circumferential alignments, the penetrating elements of the third circumferential alignment being distributed at intersections of helical alignments defined by the penetrating elements of the first and second circumferential alignments with helices passing through penetrating elements of the first circumferential alignment at an angle equal to the winding angle of the second type of fibers.

8. A method according to claim 1 wherein $$D \geq K' \cdot d$$

where $K'$ = a number selected from the group consisting of integers and mixed numbers in the range from 3 to 4, and $d$ = diameter of a penetrating element.

9. A method according to claim 1 wherein n is 3.

10. A method according to claim 1 wherein the fibers are polymerized.

11. A method according to claim 1, further comprising cutting the tube into sections of desired lengths at right angles to the longitudinal axis.

12. A joined composite material tube and tubular metal fitting formed by the method of claim 1.

13. A joined composite material tube and tubular metal fitting according to claim 12 wherein said metal fitting is an end coupling member comprising an inner part partially received inside said tube, and an outer part mounted outside said tube; and said penetrating elements comprise radial pins with ends engaged in bores in said inner and outer parts.

14. A joined composite material tube and tubular metal fitting according to claim 13 wherein said bores in said inner part are closed radially outside of an inner face of said inner part.

* * * * *

UNITED STATES PATENT AND TRADEMARK OFFICE
CERTIFICATE OF CORRECTION

PATENT NO. : 5,288,109

DATED : February 22, 1994

INVENTOR(S) : Marcel Auberon et al

It is certified that error appears in the above-identified patent and that said Letters Patent is hereby corrected as shown below:

On the title page,

"[73] Assignee:   Societe Nationale Industrielle et Aerospatiale, Paris; Institue Francois du Petrole, Rueil-Malmaison, both of France"

should read

-- [73] Assignee:   Aerospatiale Societe Nationale Industrielle, Paris; Institut Francois du Petrole, Rueil-Malmaison, both of France --

Signed and Sealed this

First Day of August, 1995

*Attest:*

BRUCE LEHMAN

*Attesting Officer*      *Commissioner of Patents and Trademarks*